United States Patent [19]

Watkins

[11] 3,917,673

[45] Nov. 4, 1975

[54] CATALYTIC PROCESS FOR THE MANUFACTURE OF UNSATURATED ACIDS AND ESTERS

[75] Inventor: Windell C. Watkins, Longview, Tex.

[73] Assignee: Eastman Kodak Company, Rochester, N.Y.

[22] Filed: Oct. 26, 1973

[21] Appl. No.: 409,822

[52] U.S. Cl............ 260/486 D; 252/437; 260/526 N
[51] Int. Cl.$^2$.................... C07C 51/00; C07C 67/30
[58] Field of Search..................... 260/486 D, 526 N

[56] References Cited
UNITED STATES PATENTS 356,887   1/1975   Schneider....................... 260/486 D 3,855,279   12/1974   Watkins.......................... 260/486 D

*Primary Examiner*—Vivian Garner
*Attorney, Agent, or Firm*—Edward R. Weber; Daniel B. Reece III

[57] ABSTRACT

Lower aliphatic acids, e.g., isobutyric acid, and esters, e.g., methyl isobutyrate, are dehydrogenated in the presence of oxygen and a solid heterogeneous dehydrogenation catalyst at temperatures in the range of from about 250° to about 600°C. The catalyst is the calcined residue of a mixture of bismuth oxynitrate, iron phosphate, and lead phosphate.

8 Claims, No Drawings

CATALYTIC PROCESS FOR THE MANUFACTURE OF UNSATURATED ACIDS AND ESTERS

This invention relates to the synthesis of unsaturated lower aliphatic acids and esters of such acids by catalytic oxidative dehydrogenation of the corresponding saturated acids and esters.

The catalytic dehydrogenation of the lower alkane acids and their esters has been described in prior art. One known process has been carried out using a metal oxide catalyst but with no molecular oxygen present during the dehydrogenation. In such a process the catalyst is rapidly deactivated and requires frequent regeneration. Such a process operates with relatively low conversion per pass which increases operating costs and size of required equipment. See data presented in Industrial and Engineering Chemical Products, Research and Development, Volume II, p. 287 (1963) and U.S. Pat. No. 2,945,057. In another known process, dehydrogenation of lower alkane acids and their esters has been carried out with a metal sulfide oxidizing agent, but again without the presence of molecular oxygen. In that process the metal sulfide acts as a mild oxidizer which is chemically reduced and requires frequent regeneration. See U.S. Pat. No. 3,370,087.

More recently, U.S. Pat. No. 3,634,494 describes a process wherein the catalyst consists of the calcined mixed phosphates of iron, bismuth, and, in some embodiments, lead. The catalyst of U.S. Pat. No. 3,634,494 gives attractive conversions and yields; however, it suffers from a relatively short catalyst life. In addition, the catalyst cannot be satisfactorily regenerated to its original active state. Therefore, the process of U.S. Pat. No. 3,634,494 loses much of its attractiveness.

Of the many catalytic systems described in the literature, including those detailed above, none have all the desirable properties of good catalysts. Among the criteria by which a catalyst is judged acceptable are high conversion and yield, long catalyst life and ease of regeneration to the original activity.

Accordingly, one of the objects of the instant invention is to provide an improved catalyst giving good conversions and yields and having a long catalyst life.

Another object of the instant invention is to provide a catalyst which can be easily regenerated to its original activity.

Yet another object of the invention is to provide a catalyst which can be simply prepared from readily available, inexpensive materials.

These and other objects and advantages of the instant invention will become quite clear from the following description and the appended claims.

In accordance with the instant invention, a lower aliphatic acid or an ester thereof having the formula

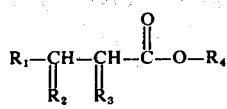

wherein $R_1$, $R_2$, $R_3$ and $R_4$ are selected from the group consisting of hydrogen and lower alkyl groups containing 1-4 carbon atoms, is selectively dehydrogenated to the $\alpha,\beta$-unsaturated equivalent acid or ester by contacting a feed-gas mixture comprising oxygen and the organic compound with an oxydehydrogenation catalyst comprising bismuth, iron and lead combined with phosphorus and oxygen, which catalyst can be described nominally as the calcined residue of a mixture of bismuth oxynitrate, iron phosphate and lead phosphate. Dehydrogenation occurs at temperatures of from about 250°C. to about 600°C., preferably from about 350°C. to about 500°C. For economy, a preferred pressure for the oxydehydrogenation is about atmospheric pressure, but the process may be carried out at pressures in the range of from about 0.3 atmosphere to about 10 atmospheres or higher if desired. Water, present as steam during the reaction, is found to improve the results of the process. The ratio of oxygen to saturated acid or ester in the feed mixture is preferably about 0.1 to about 6 gram atoms of oxygen per mole of compound to be dehydrogenated. The oxygen may be diluted with an inert gas such as helium, nitrogen or argon. A preferred source of oxygen is air.

The catalyst of the instant invention is the calcined residue of a mixture of bismuth oxynitrate, iron phosphate and lead phosphate, wherein the ratio of bismuth atoms relative to one atom of iron is from about 0.1 to about 12 and the ratio of lead atoms relative to one atom of iron is from about 0.1 to about 10. In a preferred embodiment, bismuth nitrate pentahydrate, ferric nitrate enneahydrate and lead nitrate are dissolved in a small amount of 1N nitric acid to yield a solution having a pH of from about 0 to about 1.7. This solution is then diluted to a pH of from about 2.0 to about 4.0 with water so as to precipitate bismuth oxynitrate. The slurry is vigorously stirred and aqueous dibasic ammonium phosphate is added until a pH of from about 5.0 to about 7.0 is attained. Iron phosphate and lead phosphate are precipitated during this addition. The combined precipitate is removed by vacuum filtration and then reslurried in water. The solid is removed by vacuum filtration and thoroughly dried at 120°C. to about 140°C. The dried filter cake is broken into particles of the desired size for use as a catalyst and these particles are calcined at 550° C. for two hours. The catalyst is then ready for use in the process.

The most important points in the catalyst preparation can be summarized as follows:

1. The bismuth must be precipitated as the bismuth oxynitrate prior to the addition of phosphate. If the solution is diluted with nitric acid instead of water, the bismuth will not precipitate as the oxynitrate but will subsequently be precipitated as the phosphate, resulting in a catalyst with diminished activity, short life, and which cannot be regenerated.
2. The iron and lead are preferably precipitated with dibasic ammonium phosphate. The use of monobasic ammonium phosphate results in a catalyst of high activity but with a short life. Precipitation with phosphoric acid yields a catalyst with lower activity for the desired reaction and with the tendency to powder under reaction conditions.
3. The pH of the solution at completion of the precipitation of the iron and lead phosphate is preferably from about 5.0 to about 7.0.
4. The catalyst must be washed thoroughly to remove salts such as ammonium nitrate and ammonium phosphate. Failure to do this results in diminished conversions and yields.
5. The catalyst must be broken into appropriate particle sizes prior to calcining to obtain the highest activity.

6. The catalyst particles should be calcined at above 500°C. (preferably about 500°C. to about 600°C., and more preferably about 550°C.) to obtain a catalyst of high activity. Failure to calcine at these temperatures results in lower activity.

The catalyst may be used in its calcined solid form without support, or it may be used on a catalyst support such as silica, alumina, silica-alumina or silicon carbide. The process in which the subject catalyst is used involves the passage of a mixture of the feed saturated acid or ester, water, and air over the catalyst contained in a fixed bed. The temperature of the catalyst bed is maintained at from about 250°C. to about 600°C., a preferred range being from about 350°C. to about 500°C., and a more preferred operating range of from about 400°C. to about 450°C.

In practice, higher conversions and yields are obtained when several catalyst zones are used with mixing zones separating them. The total volume of air is added in portions above each catalyst zone. Most of the work with the catalyst of the invention has been carried out in a reactor with two catalyst zones and two air inlet points. The data obtained in a two-stage reactor can be related to a multistage reactor as has been shown when a three-stage reactor was used in a benchscale pilot plant to determine catalyst life, scale-up factors, etc.

The reactor effluent is cooled to condense a mixture composed mainly of water, unreacted feed acid or ester, and product $\alpha,\beta$-unsaturated acid or ester. The presence of water in the reactor is necessary for the oxidative dehydrogenation reaction but its role in the reaction mechanism is unknown. Optimum concentration of water usually will be in the range of 0.5 to about 20 moles water per mole of feed acid or ester. However, up to about 40 moles of water per mole of acid or ester may be used.

The catalyst of the prior art U.S. Pat. No. 3,634,494 is a mixture of the phosphates of bismuth, iron and lead with the metals present in an atomic ratio of 2:1:0.6, respectively.

It was not possible to obtain the conversions and yields equivalent to those reported in U.S. Pat. No. 3,634,494 by following the teachings contained therein. Furthermore, the procedures detailed in U.S. Pat. No. 3,634,494 are somewhat ambiguous, which makes it difficult to accurately ascertain the catalyst described. For example, in the procedure described in U.S. Pat. No. 3,634,494, bismuth nitrate, ferric nitrate and lead nitrate are dissolved in 1N nitric acid and then diluted with either 1N nitric acid or water. This implies that in either case no precipitate forms. In actuality, a precipitate of bismuth oxynitrate will form if the solution is diluted with water. Complete solution is further implied in the statement that a milky precipitate forms upon addition of aqueous dibasic ammonium phosphate. The specification further states that any soluble phosphate salt or phosphoric acid could be used to precipitate the metal with equivalent results. In accordance with the instant invention it has been found that only dibasic ammonium phosphate gives a catalyst of high activity, long life and which can be successfully regenerated. Likewise, U.S. Pat. No. 3,634,494 states that the catalyst is calcined at 400°C. to 600°C. prior to breaking into granules for use in the catalyst bed, while the unique catalyst of the instant invention has a higher activity if calcining is performed after breaking into granules and if calcining is conducted at a temperature of above 500°C. It was further discovered that the catalyst of U.S. Pat. No. 3,634,494 had a relatively short active life and cannot be satisfactorily regenerated to its original level of activity. In contrast to this, the catalyst of the instant invention is readily regenerated by passing air through the catalyst bed at temperatures of from about 450° to about 550°C. This can be done without the necessity of removing the catalyst from the process equipment. When the catalyst is regenerated in this manner, its activity readily returns to the original high level.

When a catalyst is prepared according to the procedure of U.S. Pat. No. 3,634,494 and used in a two-stage reactor, conversions and yields of isobutyric to methacrylic acid are in the range of 35 ± 5 percent and 45 ± 5 percent, respectively. Under identical reaction conditions, a catalyst prepared in accordance with the instant invention, i.e., the calcined residue of a mixture of bismuth oxynitrate with the phosphates of iron and lead, gives conversions and yields to methacrylic acid of 45 ± 5 percent and 55 ± 5 percent, respectively. Thus, the catalyst of the instant invention is a great improvement over the catalyst of the prior art.

This invention is further illustrated by the following examples which are set forth for purposes of illustration only and should not be construed as limiting the invention in any manner.

The reactor used in the following examples is a 1-inch by 30-inch Vycor tube with a thermowell in the center extending the length of the tube. At the top of the reactor are provisions for feeding air, isobutyric acid, and water. Another air inlet is positioned 10 inches from the bottom of the tube. Isobutyric acid and water are metered into the reactor through a calibrated pump. The rate of isobutyric acid addition is 40 milliliters per hour, and water is fed at such a rate as to obtain the desired water to isobutyric acid mole ratio. Air is introduced into the reactor at two feed points through rotameters at such rates as to obtain the desired oxygen to isobutyric acid mole ratio. Thirty-one percent of the air is fed to the top of the reactor and sixty-nine percent is fed in the center. Two 20-milliliter catalyst beds are positioned in the reactor such that the central air inlet is between them. The volume between the catalyst beds and above the upper bed is filled with Vycor chips. The reactor is placed in an electric furnace and the temperature of the reactor is measured and controlled by means of thermocouples in the thermowell which are attached to temperature controllers.

The reactor effluent is condensed and collected. Every two hours the effluent is analyzed by gas chromatography using an internal standard and the conversion and yield are calculated by the following equations.

$$\% \text{ conversion} = \frac{\text{moles MAA in product}}{\text{moles IBA fed}} \times 100$$

$$\% \text{ yield} = \frac{\text{moles MAA in product}}{\text{moles IBA fed} - \text{moles IBA in product}} \times 100$$

where MAA = methacrylic acid
IBA = isobutyric acid

After the reactor has run for eight hours, the conversions and yields for all the samples are averaged and reported. The selectivity shown in U.S. Pat. No. 3,634,494 is equivalent to the percent yield defined above. For comparison, the conversion calculated by the method used in U.S. 3,634,494 is also reported.

This conversion, which is preferably called consumption, is defined by the following equation.

$$\% \text{ consumption} = \frac{\text{moles IBA fed} - \text{moles IBA in product}}{\text{moles IBA fed}} \times 100$$

Also calculated for each run are water to isobutyric acid mole ratio, oxygen to isobutyric acid mole ratio, and contact time. Contact time ($\theta$) is defined by the following equation.

$$\theta = \frac{V_c \cdot 273}{V_g \cdot (273 + T)}$$

where
- $V_c$ = volume of catalyst in milliliters
- $V_g$ = total gas flow rate at STP in milliliters per second
- T = reactor temperature in °C.

EXAMPLE 1

This example shows the high activity of the catalyst of this invention. Also, the ability to regenerate this catalyst is demonstrated.

A mixture of 40.4 grams ferric nitrate enneahydrate, 97.0 grams bismuth nitrate pentahydrate, and 19.9 grams lead nitrate is dissolved in enough 1N nitric acid to make 300 milliliters solution (pH = 0.9). The salt solution is diluted to 1,000 milliliters with water effecting the precipitation of bismuth oxynitrate (pH = 2.8). The slurry is stirred rapidly and 1,000 milliliters of an aqueous solution containing 264 grams dibasic ammonium phosphate is added slowly effecting the precipitation of iron and lead (pH = 5.5 after addition is complete). The precipitate is removed by vacuum filtration and the filter cake is reslurried in 2,000 milliliters water. After stirring for 1 hour, the solid is removed by vacuum filtration and the filter cake dried overnight in an oven thermostated at 120°–140°C. The catalyst cake is broken into 4–10 mesh particles and these particles calcined at 550°C. for two hours. This catalyst, which has a metal ratio of 2 Bi/1 Fe/0.6 Pb, is placed in the reactor, heated to 450°C., and isobutyric acid, water, and air are passed through it. The following results are obtained over an 8 hour period.
- Conversion = 44.5%
- Consumption = 75.6%
- Yield = 58.9%
- Water/Isobutyric Acid = 11.8
- Oxygen/Isobutyric Acid = 0.71
- Contact Time = 0.33 second The catalyst is regenerated by heating at 500°C. while passing air through the catalyst bed. After cooling the catalyst bed to 450°C., another eight hour run is made under the same conditions with the following results.
- Conversion = 44.7%
- Consumption = 74.9%
- Yield = 59.7%

The catalyst is regenerated in the same manner and eight hour runs made for an additional 15 cycles. The last run made with this catalyst gives a conversion of 44.1 percent and yield of 57.8 percent with all the runs in between having equivalent results.

EXAMPLE 2

The catalyst described in U.S. Pat. No. 3,634,494 is prepared for this example to demonstrate the lower conversions and yields obtainable with it and to show its short life and its inability to be regenerated.

In accordance with the teachings of U.S. Pat. No. 3,634,494 a mixture of 40.4 grams ferric nitrate enneahydrate, 97.0 grams bismuth nitrate pentahydrate and 19.9 grams lead nitrate is dissolved in enough 1N nitric acid to make 300 milliliters solution (pH = 0.9). The salt solution is diluted to 1,000 milliliters with 1N nitric acid (pH = 1.0); then, with stirring, 1,000 milliliters of an aqueous solution containing 264 grams dibasic ammonium phosphate is added effecting the precipitation of the bismuth, iron, and lead (pH = 5.0 after the addition is complete). The precipitate is removed by vacuum filtration, reslurried in 2,000 milliliters water, and refiltered. The filter cake is dried overnight at 120°–140°C., broken into 4–10 mesh particles, and calcined at 550°C. for two hours. This catalyst, with a metal ratio of 2 Bi/1 Fe/0.6 Pb, is placed in the reactor and heated to 450°C. The reactants are fed to the reactor as in Example 1. The following results are obtained over an eight hour run.
- Conversion = 34.5%
- Consumption = 76.0%
- Yield = 45.4%
- Water/Isobutyric Acid = 12.0
- Oxygen/Isobutyric Acid = 0.71
- Contact Time = 0.31 second At the end of the above run, the conversion and yield have dropped to 29 percent and 35 percent, respectively. Heating the catalyst at 500°C. while passing air through the catalyst bed for 16 hours does not improve these results, i.e., the catalyst cannot be returned to its original activity by this regeneration procedure.

EXAMPLE 3

This example shows the effect of incomplete removal of soluble salts from the catalyst of the instant invention.

The catalyst is prepared according to Example 1 except the catalyst filter cake is not reslurried in water. The catalyst granules are placed in the reactor, heated to 450°C., and the following results obtained.
- Conversion = 24.9%
- Consumption = 63.7%
- Yield = 39.1%
- Water/Isobutyric Acid = 12.2
- Oxygen/Isobutyric Acid = 0.73
- Contact Time = 0.32 second The catalyst is heated to 500°C. with air passing through it for 16 hours. Another run is made with a conversion of 22.4 percent and yield of 37.5 percent. It will be noted that conversion and yield are significantly lower than obtained in Example 1.

EXAMPLE 4

This example shows the effect of calcining the catalyst cake prior to breaking into granules.

The procedure given for catalyst preparation in Example 1 is followed except the calcining is accomplished prior to sizing to the desired 4–10 mesh. The catalyst is placed in the reactor and the following results are obtained at 450°C.
- Conversion = 37.0%
- Consumption = 73.4%
- Yield = 50.4%
- Water/Isobutyric Acid = 12.8
- Oxygen/Isobutyric Acid = 0.75
- Contact Time = 0.32 second Once again conversion and yield are lower than obtained in Example 1.

EXAMPLE 5

This example shows the effect of using monobasic ammonium phosphate to precipitate the iron and lead instead of dibasic ammonium phosphate.

The procedure for catalyst preparation given in Example 1 is followed except that 230 grams of monobasic ammonium phosphate is substituted for the dibasic ammonium phosphate (pH = 4.7 after the addition is complete). The catalyst is placed in the reactor, heated to 450°C. and isobutyric acid, water, and air fed for eight hours. The following results are obtained:

Conversion = 53.8%
    Consumption = 88.3%
    Yield = 60.9%
    Water/Isobutyric Acid = 12.4
    Oxygen/Isobutyric Acid = 0.74
    Contact Time = 0.33 second Continuing the run past eight hours, the catalyst rapidly loses activity by giving lower and lower conversions and yields. The catalyst life is not considered good since the catalyst of Example 1 showed no similar drop in activity during 72 hours of continuous operation. The catalyst is regenerated at 500°C. with air and another eight hour run gives 55.7 percent conversion, 87.4 percent consumption and 63.7 percent yield.

EXAMPLE 6

This example shows the relative insensitivity of conversions and yields to methacrylic acid over a wide range of water to isobutyric acid mole ratios when the catalyst of this invention is used.

The catalyst described in Example 1 is placed in the reactor at 450°C. and isobutyric acid is fed at a rate of 40 milliliters per hour. The water feed rate is adjusted to obtain various water to isobutyric acid mole ratios. At each ratio, the reactor is operated for eight hours and the average conversion and yield calculated. The catalyst is regenerated with air at 500°C. for 16 hours between each run. The following data is obtained. The oxygen-isobutyric acid ratio is 0.71.

| Water/Isobutyric Acid Ratio | 5.2 | 9.3 | 12.1 | 18.0 | 23.3 | 30.2 |
|---|---|---|---|---|---|---|
| Conversion, % | 35.0 | 44.1 | 44.8 | 48.4 | 49.8 | 49.7 |
| Yield, % | 48.7 | 60.8 | 59.5 | 61.1 | 64.7 | 67.3 |
| Consumption % | 72.7 | 72.5 | 75.3 | 79.2 | 77.0 | 73.8 |

EXAMPLE 7

This example shows that the catalyst of this invention can be used over a wide temperature range without serious changes in conversion and yield.

The catalyst described in Example 1 is placed in the reactor and the temperature adjusted to the desired reaction temperature. Isobutyric acid is fed at a rate of 40 milliliters per hour and the water to isobutyric acid mole ratio is adjusted to 12.1. At each temperature, the reactor is operated for 8 hours and the average conversion and yield determined. Between each run, the catalyst is regenerated with air at 500°C. for 16 hours. The data obtained is tabulated below. The oxygen to isobutyric acid ratio is 0.71.

| Temperature, °C. | 350 | 400 | 450 |
|---|---|---|---|
| Conversion, % | 36.9 | 45.6 | 44.1 |
| Yield, % | 59.5 | 69.3 | 57.8 |
| Consumption, % | 62.0 | 65.8 | 76.3 |

EXAMPLE 8

This example demonstrates the long life of the catalyst of this invention.

A Vycor reactor is constructed with five air inlets spaced at regular intervals in the reactor. The catalyst described in Example 1 is placed in the reactor in five equivolume beds with Vycor chips separating them. The air inlets are spaced such that air is fed into the Vycor chips separating the catalyst beds thus assuring good mixing. A mixture of gaseous isobutyric acid and water is fed to the top of the reactor and the reactor effluent is condensed. This product is composited and analyzed every 24 hours. The reaction conditions are:

Contact Time = 0.25 second
    Temperature = 380–490°C.
    Water/Isobutyric Acid Mole Ratio = 21.5
    Oxygen/Isobutyric Acid Mole Ratio = 0.9

Under these conditions, the conversion is 45.6 percent, consumption is 65.8 percent and yield is 68.8 percent after three days operation. After 6 days operation, the conversion is 50.0 percent, consumption is 69.6 percent and the yield is 71.8 percent. The catalyst is regenerated in the usual manner and operation continued. The conversion and yield are comparable to those obtained prior to regeneration.

Although the invention has been described in considerable detail with reference to certain preferred embodiments thereof, it will be understood that variations and modifications can be effected without departing from the spirit and scope of the invention as described hereinabove.

I claim:

1. A process for making unsaturated acids and esters by dehydrogenation of a compound defined by the formula

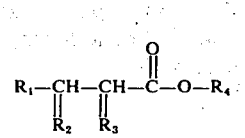

wherein each of $R_1$, $R_2$, $R_3$ and $R_4$ is selected from hydrogen and lower alkyl groups containing 1–4 carbon atoms, which process comprises contacting a feed gas mixture comprising said compound, oxygen and water at a temperature in the range of from about 250° to about 600°C. with a solid catalyst consisting of the calcined residue of a mixture of bismuth oxynitrate, iron phosphate and lead phosphate wherein the atomic ratio of bismuth to iron is from about 0.1:1 to about 12:1, and the atomic ratio of lead to iron is from about 0.1:1 to about 10:1, which calcining is conducted at a temperature above about 500°C.

2. A process according to claim 1 wherein the atomic ratio of the bismuth to iron is from about 1.5:1 to about 3:1 and the atomic ratio of the lead to iron is from about 0.1:1 to about 10:1.

3. A process according to claim 1 wherein the process is conducted at a temperature of from about 350° to about 500°C.

4. A process according to claim 1 wherein the process is conducted at a temperature of from about 400° to about 450°C.

5. A process according to claim 1 wherein the catalyst is prepared by the steps of
1. preparing a solution of salts of bismuth, iron and lead in nitric acid,
2. diluting said nitric acid with water so as to precipitate bismuth oxynitrate,
3. adding dibasic ammonium phosphate to the remaining solution so as to precipitate ferric phosphate and lead phosphate,
4. washing the resultant mixed precipitate,
5. drying said precipitate,
6. adjusting the size and shape of the precipitate particles to that desired for process use, and
7. calcining said adjusted catalyst particles at a temperature above 500°C.

6. A process according to claim 5 wherein the initial solution of salts of bismuth, iron and lead in nitric acid has a ph of from about 0 to about 1.7.

7. A process according to claim 5 wherein the bismuth oxynitrate is precipitated by diluting the nitric acid solution to a pH of from about 2 to about 4.

8. A process according to claim 5 wherein the pH of the solution following the addition of the dibasic ammonium phosphate is from about 5 to about 7.

* * * * *

UNITED STATES PATENT OFFICE
CERTIFICATE OF CORRECTION

Patent No. 3,917,673  Dated November 4, 1975

Inventor(s) Windell C. Watkins

It is certified that error appears in the above-identified patent and that said Letters Patent are hereby corrected as shown below:

Column 1, lines 58-63, delete the formula and insert therefor

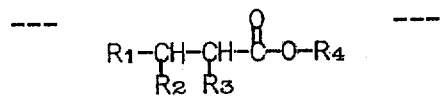

Column 2, line 28, delete "1N" and insert therefor ---1$\underline{N}$---.

Column 3, line 49, delete "1N" and insert therefor ---1$\underline{N}$---.

Column 3, line 50, delete "1N" and insert therefor ---1$\underline{N}$---.

Column 5, line 27, delete "1N" and insert therefor ---1$\underline{N}$---.

Column 6, line 4, delete "1N" and insert therefor ---1$\underline{N}$---.

Column 6, line 6, delete "1N" and insert therefor ---1$\underline{N}$---.

Column 8, lines 45-49, cancel the formula and insert therefor

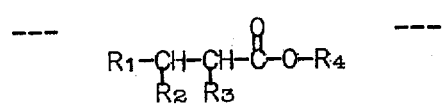

Signed and Sealed this seventeenth Day of February 1976

[SEAL]

Attest:

RUTH C. MASON
*Attesting Officer*

C. MARSHALL DANN
*Commissioner of Patents and Trademarks*